United States Patent [19]

Itani et al.

[11] Patent Number: 4,698,744
[45] Date of Patent: Oct. 6, 1987

[54] INVERTER APPARATUS

[75] Inventors: Kiyoshi Itani; Hisashi Tokizaki; Tomohide Funagoshi; Nobuo Ohtsuka; Katsuhiro Ohkubo; Hikaru Katsuki, all of Gunma, Japan

[73] Assignee: Sanyo Electric Co., Ltd., Japan

[21] Appl. No.: 713,479

[22] Filed: Mar. 19, 1985

[30] Foreign Application Priority Data

Mar. 26, 1984 [JP] Japan .................................. 59-57779
Apr. 5, 1984 [JP] Japan .................................. 59-68719
Jun. 5, 1984 [JP] Japan .................................. 59-114845
Jul. 19, 1984 [JP] Japan .................................. 59-149961
Jul. 25, 1984 [JP] Japan .................................. 59-154961

[51] Int. Cl.$^4$ .......................... G05B 19/02; H02P 5/40
[52] U.S. Cl. ........................................ 364/140; 165/14; 318/802; 318/811; 363/41; 364/400; 364/506; 364/557
[58] Field of Search ............... 364/130, 400, 140, 557, 364/505, 506, 483, 492; 318/801, 802, 803, 807, 810, 811, 254, 138; 363/41, 55, 56, 98, 132, 137; 165/13, 14, 17

[56] References Cited

U.S. PATENT DOCUMENTS 4,316,132 2/1982 Geppert ........................ 318/811 X
4,456,865 6/1984 Robertson, Jr. et al. ....... 318/811 X
4,458,194 7/1984 Geppert et al. ..................... 318/811
4,491,768 1/1985 Slicker ............................ 318/811 X
4,497,031 1/1985 Froehling et al. ............... 364/557 X
4,590,413 5/1986 Gritter et al. .................... 318/811 X Primary Examiner—Joseph Ruggiero
Attorney, Agent, or Firm—Darby & Darby

[57] ABSTRACT

An inverter apparatus comprises a bridge circuit composed of a combination of a plurality of switching transistors and a microprocessor controlling turning on and turning off of these switching transistors. Patterns of combinations of ON and OFF states of respective switching transistors obtained based on the theory of PWM (pulse width modulation) are stored in a first ROM of microprocessor. Transition of the pattern for each range of 0°–30° in electrical angle is stored in a second ROM in the sequence of periods subdivided from the range. Data of the time during which the pattern to be held for each period is stored in a third ROM. The microprocessor sets the holding time data in a timer, and also outputs the ON/OFF pattern, thereby turning on or turning off of each switching transistor is controlled in accordance with the count of this timer and the ON/OFF pattern. By repeating this cycle, a switching signal which continues during one cycle of AC (range of 0°–360° in electrical angle) is given to each switching transistor. Accordingly, an AC output by the PWM system is obtainable from the bridge circuit.

12 Claims, 28 Drawing Figures

|  | 1 ~ 10 Hz | | 11 ~ 20 Hz | | 2024 ~ |
|---|---|---|---|---|---|
|  | 0 | ~ 511 | 512 | ~ 1023 | |
| Q1 | | | | | |
| Q2 | | | | | |
| Q3 | | | | | |
| Q4 | | | | | |
| Q5 | | | | | |
| Q6 | | | | | |

ON/OFF TABLE OF TRANSISTORS

| PERIOD<br>TRAN-<br>SISTOR | T0 | T1 | T2 | T3 | T4 | T5 | T6 | T7 | T8 | T9 | T10 | T11 | T12 |
|---|---|---|---|---|---|---|---|---|---|---|---|---|---|
| Q1 | OFF | OFF | OFF | ON | ON | ON | OFF | OFF | OFF | ON | ON | ON | OFF |
| Q2 | OFF | OFF | OFF | OFF | ON | OFF | OFF | OFF | OFF | OFF | ON | OFF | OFF |
| Q3 | ON | OFF | ON | ON | ON | ON | ON | OFF | ON | ON | ON | ON | OFF |
| Q4 | ON | ON | ON | OFF | OFF | OFF | ON | ON | ON | OFF | OFF | OFF | ON |
| Q5 | ON | ON | ON | ON | OFF | ON | ON | ON | ON | ON | OFF | ON | ON |
| Q6 | OFF | ON | OFF | OFF | OFF | OFF | OFF | ON | OFF | OFF | OFF | OFF | ON |

FIG. 7

PATTERN TABLE

| TRAN-SISTOR | BASIC PATTERN (P) | | | | | | | | PATTERN OF TRANSITION PERIOD (P') | | | | | | | | | | | | | | | | | |
|---|---|---|---|---|---|---|---|---|---|---|---|---|---|---|---|---|---|---|---|---|---|---|---|---|---|---|
| | P0 | P1 | P2 | P3 | P4 | P5 | P6 | P7 | P8 | P9 | P10 | P11 | P12 | P13 | P14 | P15 | P16 | P17 | P18 | P19 | P20 | P21 | P22 | P23 | P24 | P25 |
| Q1 | 0 | 1 | 1 | 1 | 0 | 0 | 0 | 1 | 0 | 1 | 0 | 1 | 0 | 0 | 0 | 1 | 1 | 0 | 0 | 0 | 0 | 0 | 1 | 0 | 0 | 0 |
| Q2 | 0 | 0 | 0 | 1 | 1 | 1 | 0 | 1 | 0 | 0 | 0 | 1 | 0 | 1 | 0 | 0 | 0 | 1 | 1 | 1 | 0 | 1 | 0 | 1 | 0 | 0 |
| Q3 | 1 | 1 | 0 | 0 | 0 | 1 | 1 | 1 | 1 | 1 | 0 | 0 | 0 | 1 | 1 | 0 | 0 | 0 | 1 | 1 | 1 | 0 | 0 | 0 | 0 | 1 |
| Q4 | 1 | 0 | 0 | 0 | 1 | 1 | 1 | 0 | 1 | 0 | 0 | 0 | 1 | 0 | 1 | 1 | 0 | 1 | 0 | 1 | 0 | 1 | 0 | 0 | 1 | 0 |
| Q5 | 1 | 1 | 1 | 0 | 0 | 0 | 1 | 0 | 1 | 0 | 1 | 1 | 1 | 0 | 0 | 1 | 0 | 0 | 1 | 0 | 0 | 1 | 0 | 0 | 0 | 0 |
| Q6 | 0 | 0 | 1 | 1 | 1 | 0 | 0 | 0 | 0 | 0 | 1 | 0 | 1 | 0 | 1 | 0 | 1 | 1 | 0 | 0 | 1 | 0 | 1 | 0 | 0 | 0 |

FIG. 8

TRANSITION TABLE OF PATTERNS

| PERIOD θ | C0 | C1 | C2 | ... | C22 | C23 | C24 |
|---|---|---|---|---|---|---|---|
| 0°–60° | P0 | P8 | x | ... | x | x | x |
| 60°–120° | P1 | P9 | P0 | ... | P2 | P10 | P15 |
| 120°–180° | P2 | P10 | P1 | ... | P3 | P11 | P16 |
| 180°–240° | P3 | P11 | P2 | ... | P4 | P12 | P17 |
| 240°–300° | P4 | P12 | P3 | ... | P5 | P13 | P18 |
| 300°–360° | P5 | P13 | P4 | ... | P0 | P8 | P19 |

FIG. 9

| PERIOD \ FREQUENCY (Hz) | 20 | 24 | 28 | 32 | ... | 112 | 116 | 120 |
|---|---|---|---|---|---|---|---|---|
| C0 | | | | | | | | |
| C1 | 132 | ↑ | ↑ | ↑ | | 149 | 144 | 138 |
| C2 | 668 | 514 | 404 | 32 | | ↑ | ↑ | ↑ |
| C3 | 108 | ↑ | ↑ | ↑ | | ↑ | ↑ | ↑ |
| C4 | 160 | ↑ | 161 | 32 | | 221 | 216 | 211 |
| C5 | 636 | 482 | 372 | ↑ | | ↑ | ↑ | ↑ |
| C6 | 183 | ↑ | ↑ | ↑ | | 227 | ↑ | ↑ |
| C7 | 75 | ↑ | ↑ | ↑ | | ↑ | ↑ | ↑ |
| C8 | 715 | 560 | 450 | ↑ | | 78 | 72 | 67 |
| C9 | 49 | ↑ | 50 | ↑ | | 84 | ↑ | ↑ |
| C10 | 204 | ↑ | 355 | 272 | | ↑ | ↑ | ↑ |
| C11 | 600 | 465 | ↑ | ↑ | | 592 | 574 | 558 |
| C12 | 231 | ↑ | 508 | 425 | | ↑ | ↑ | ↑ |
| C13 | 773 | 618 | | | | ↑ | ↑ | ↑ |

TIME TABLE

FIG.11
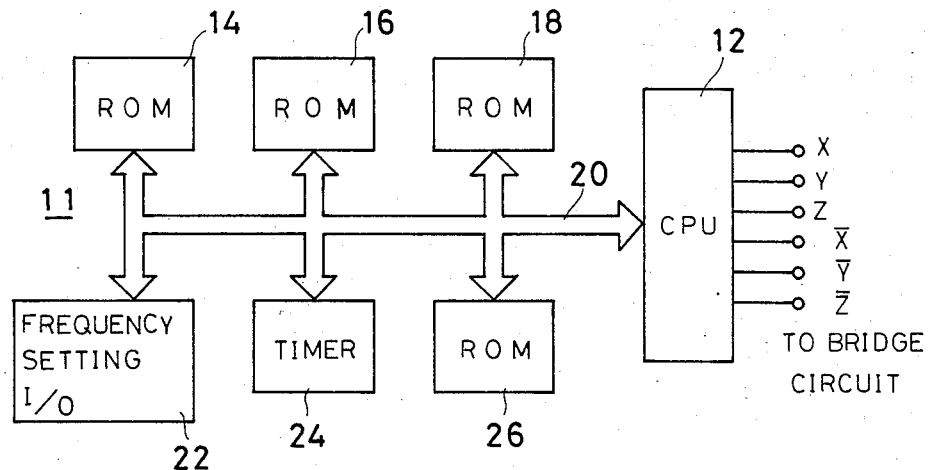
FIG.14
TABLE OF INITIAL VALUE
| FREQUENCY | 20 | 24 | 28 | 32 | --------- |
|---|---|---|---|---|---|
| f3 (F) | 0 | 154 | 264 | 348 | --------- |
FIG.22
PRIOR ART
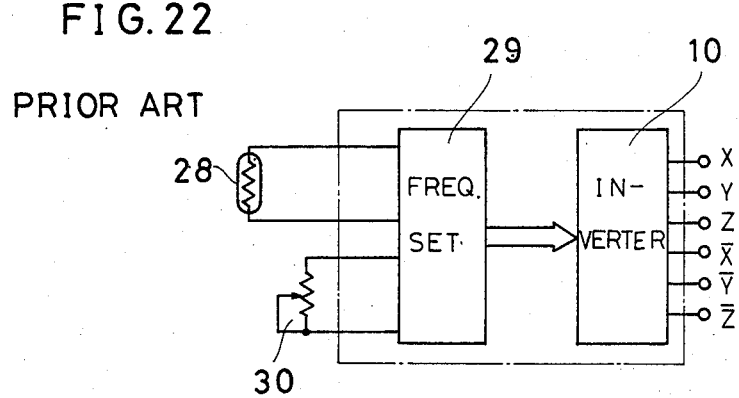

FIG.16

TIME TABLE AT V/F ≑ 0.5

| PERIOD / FREQUENCY | | 10 | 20 | 30 | 40 | 50 | 60 |
|---|---|---|---|---|---|---|---|
| C 0 | C 24 | 28 | → | → | → | → | → |
| C 1 | C 23 | 1798 | 872 | 563 | 409 | 316 | 255 |
| C 2 | C 22 | 22 | → | → | → | → | → |
| C 3 | C 21 | 34 | → | → | → | → | → |
| C 4 | C 20 | 1791 | 865 | 557 | 402 | 310 | 248 |
| C 5 | C 19 | 39 | → | → | → | → | → |
| C 6 | C 18 | 16 | → | → | → | → | → |
| C 7 | C 17 | 1807 | 882 | 573 | 419 | 326 | 264 |
| C 8 | C 16 | 10 | → | → | → | → | → |
| C 9 | C 15 | 43 | → | → | → | → | → |
| C 10 | C 14 | 1788 | 862 | 553 | 399 | 306 | 244 |
| C 11 | C 13 | 49 | → | → | → | → | → |
| C 12 | | 1820 | 894 | 585 | 431 | 338 | 276 |

FIG.17

| F | 10 | 20 | 30 | 40 | 50 | 60 |
|---|---|---|---|---|---|---|
| f3(F) | 0 | 926 | 1235 | 1389 | 1481 | 1542 |

FIG. 18

TIME TABLE AT $V/F \approx 1.0$

| PERIOD | FREQUENCY | 10 | 20 | 30 | 40 | 50 | 60 |
|---|---|---|---|---|---|---|---|
| C0 | C24 | 56 | → | → | → | → | → |
| C1 | C23 | 1744 | 818 | 509 | 355 | 262 | 200 |
| C2 | C22 | 45 | → | → | → | → | → |
| C3 | C21 | 67 | → | → | → | → | → |
| C4 | C20 | 1730 | 804 | 496 | 341 | 249 | 187 |
| C5 | C19 | 77 | → | → | → | → | → |
| C6 | C18 | 32 | → | → | → | → | → |
| C7 | C17 | 1763 | 837 | 529 | 374 | 282 | 220 |
| C8 | C16 | 20 | → | → | → | → | → |
| C9 | C15 | 86 | → | → | → | → | → |
| C10 | C14 | 1723 | 797 | 489 | 334 | 242 | 180 |
| C11 | C13 | 97 | → | → | → | → | → |
| C12 | | 1787 | 861 | 552 | 398 | 306 | 244 |

FIG. 19

TIME TABLE AT $V/F = 1.5$

| PERIOD | FREQUENCY | 10 | 20 | 30 | 40 | 50 | 60 |
|---|---|---|---|---|---|---|---|
| C0 | C24 | 88 | → | → | → | → | → |
| C1 | C23 | 1682 | 756 | 447 | 293 | 200 | 139 |
| C2 | C22 | 71 | → | → | → | → | → |
| C3 | C21 | 106 | → | → | → | → | → |
| C4 | C20 | 1661 | 735 | 426 | 272 | 179 | 117 |
| C5 | C19 | 121 | → | → | → | → | → |
| C6 | C18 | 50 | → | → | → | → | → |
| C7 | C17 | 1712 | 786 | 478 | 323 | 231 | 169 |
| C8 | C16 | 32 | → | → | → | → | → |
| C9 | C15 | 135 | → | → | → | → | → |
| C10 | C14 | 165 | 724 | 415 | 261 | 168 | 106 |
| C11 | C13 | 152 | → | → | → | → | → |
| C12 | | 1750 | 824 | 516 | 362 | 269 | 207 |

TIME TABLE AT $V/F \approx 2.0$

| PERIOD | FREQUENCY | | 10 | 20 | 30 | 40 | 50 | 60 |
|---|---|---|---|---|---|---|---|---|
| C0 | | C24 | 120 | → | → | → | → | → |
| C1 | | C23 | 1620 | 694 | 385 | 231 | 138 | 77 |
| C2 | | C22 | 96 | → | → | → | → | → |
| C3 | | C21 | 144 | → | → | → | → | → |
| C4 | | C20 | 1591 | 665 | 356 | 202 | 109 | 48 |
| C5 | | C19 | 165 | → | → | → | → | → |
| C6 | | C18 | 68 | → | → | → | → | → |
| C7 | | C17 | 1662 | 736 | 427 | 273 | 180 | 118 |
| C8 | | C16 | 43 | → | → | → | → | → |
| C9 | | C15 | 184 | → | → | → | → | → |
| C10 | | C14 | 1570 | 650 | 341 | 187 | 95 | 33 |
| C11 | | C13 | 208 | → | → | → | → | → |
| | C12 | | 1713 | 787 | 479 | 325 | 232 | 170 |

FIG. 21

INITIAL VALUES OF TIME

| PERIOD | V/F | 0.5 | 1.0 | 1.5 | 2.0 |
|---|---|---|---|---|---|
| C0 | C24 | 28 | 56 | 88 | 120 |
| C1 | C23 | 1798 | 1744 | 1682 | 1620 |
| C2 | C22 | 22 | 45 | 71 | 96 |
| C3 | C21 | 34 | 67 | 106 | 144 |
| C4 | C20 | 1791 | 1730 | 1661 | 1591 |
| C5 | C19 | 39 | 77 | 121 | 165 |
| C6 | C18 | 16 | 32 | 50 | 68 |
| C7 | C17 | 1807 | 1763 | 1712 | 1662 |
| C8 | C16 | 10 | 20 | 32 | 43 |
| C9 | C15 | 43 | 86 | 135 | 184 |
| C10 | C14 | 1788 | 1723 | 1650 | 1570 |
| C11 | C13 | 49 | 97 | 152 | 208 |
| C12 | | 1820 | 1787 | 1750 | 1713 |

INVERTER APPARATUS

BACKGROUND OF THE INVENTION

1. Field of the Invention

The present invention relates to an inverter apparatus. More specifically, the present invention relates to an inverter apparatus based on the theory of PWM (Pulse Width Modulation) capable of supplying a load with an AC voltage of a predetermined frequency by turning on or turning off a plurality of switching elements.

2. Description of the Prior Arts

Conventionally, the inverter apparatuses of the PAM (Pulse Amplitude Modulation) system and the PWM system have been well known wherein a plurality of switching elements (for example, transistors, thyristors or the like) are connected to form a three-phase bridge and the time duration of ON and OFF of each switching element is controlled, and thereby a DC is converted into a three-phase AC output. The present invention aims particularly at improving the inverter apparatus by the PWM system.

FIG. 1 is a circuit diagram showing one example of a bridge circuit which is the background of the present invention and thereto the present invention is applicable. A bridge circuit 10 in this FIG. 1 comprises six switching transistors Q1 through Q6 connected to a DC power source DC, and each pair of these transistors Q1 through Q6 are connected in series, and these series connections are further connected to form a three-phase bridge. Then, a three-phase AC output is withdrawn from respective terminals U, V and W connected to the points of series connection of the switching transistors. Meanwhile, the switching transistors Q1, Q2, Q3, Q4, Q5 and Q6 are put in ON state (conductive state) when a voltage or a switching signal of high level is given through base terminals thereof X, Y, Z, $\overline{X}$, $\overline{Y}$, and $\overline{Z}$, respectively.

For a first prior art of the inverter apparatus obtaining an AC output using the bridge circuit 10 by means of the PWM systems, for example, the description has been made as conventional technique in the Japanese Patent Application Laid-Open No. 46677/1982 laid open on Mar. 17, 1982. In this prior art, ON and OFF states during one cycle of AC (equivalent to 0°–360° in electrical angle) of the respective switching transistors Q1 through Q6 obtained by the PWM system are stored in a memory means such as ROM. Then, these ON or OFF signals are read out in sequence for a certain period of time, and switching signals are given to the base terminals X through $\overline{Z}$ of the respective transistors Q1 through Q6.

FIG. 2 is an address map of a ROM showing the switching signals given to the base terminals X through $\overline{Z}$ by means of this first prior art. Meanwhile, in this FIG. 2, only the switching signal based on the PWM system to be given to the base terminal X is illustrated, and the switching signals given to the rest of the base terminals Y through $\overline{Z}$ are omitted here because of similarity of form.

In FIG. 2, in the addresses 0 through 511 of the ROM, combinations of the switching signals are stored which cause the bridge circuit 10 (FIG. 1) to generate an AC of the set frequency by means of the PWM system when a frequency from 1 Hz to 10 Hz is set, and in the addresses 512 through 1023, similarly, combinations of the switching signals are stored which cause the bridge circuit 10 to generate a frequency from 11 Hz to 20 Hz. In the address 2024 and thereafter, although illustration is omitted, combinations of the switching signals are stored which are used when setting a higher frequency than the above-mentioned. The reason for using a different combination of the switching signals on a frequency basis is to adapt it to the driving characteristics of the loads to be connected to the output terminals U, V and W in FIG. 1. Accordingly, if the driving characteristics of the loads are constant independent of the frequency, only the switching signal at any one of frequencies has to be stored.

For example, when an AC output of 1–10 Hz is outputted from the output terminals U, V and W, the ROM is addressed in sequence from 0 to 511 during a certain period of time, and thereby a high level or low level of state of the switching signal, that is, "1" or "0" is read out. In response to this state, controlling signals or switching signals are given to the base terminals X through $\overline{Z}$ of the switching transistors Q1 through Q6. In this case, if all of the switching signals are read out from the addresses 0 through 511 of the ROM in sequence, only the AC component of one cycle is obtained, and therefore this is required to be repeated to obtain a continuous AC output. Then, the period of read-out of the switching signals during one cycle (0°–360°) has to be determined according to the set frequency. That is, the period of the clock which is used to address the ROM in sequence is set appropriately according to the set frequency.

In the first prior art, the switching signals during one cycle for the switching transistors Q1 through Q6 are thus stored in the memory means. Accordingly, in order to enable the frequency to be selected arbitrarily, the switching signal has to be stored for each frequency range, and a memory element having a huge memory capacity is required to attain this purpose. Furthermore, in order to reduce ripples and harmonic components by improving the resolution or precision of the AC output, the capacity of memory element is required to be further increased.

In order to solve such a problem, a second method as shown in FIG. 3 has been proposed in the Japanese Patent Application Laid-Open No. 46677/1982 as quoted previously. This second method utilizes the fact that the three-phase sinusoidal waves whose negative parts are inverted can be expressed only by six values of waveforms (characteristics) within the range of 0°–60° in electrical angle which are formed by folding back at the position of 30° in electrical angle.

That is to say, when the negative parts of the three-phase AC as shown in FIG. 3(A) are inverted by a phase inverter or the like, all the waveforms become positive as shown in FIG. 3(B). Considering by dividing into periods of 60° in electrical angle, these waveforms as shown in FIG. 3(B) become quite the same although they have different phases in respective periods I, II, III, - - -, that is different phases correspond to one another. And, the waveform in the period of 60° in electrical angle becomes axially symmetric at the middle point of each period, that is, at the position of 30° in electrical angle as shown by one dotted line in FIG. 3(B). Then, by superimposing these waveforms while shifting from one another by 30° in electrical angle, six characteristics D0 through D5 as shown in FIG. 3(C) are obtained. This, when taken in reverse, means that an ideal sinusoidal AC waveform is reformed by combining the six characteristics (waveform values) D0 through D5 as shown in FIG. 3(C).

For example, in the case of the U-phase, the characteristics D0 is selected in the range of 0°–30° in electrical angle, the characteristics D1 in the range of 30°–60° in electrical angle, the characteristics D2 in the range of 60°–90° in electrical angle, the characteristics D5 in the range of 90°–120°, the characteristics D4 in the range of 120°–150° and the characteristics D3 is selected in the range of 150°–180° in electrical angle in sequence, respectively. And, by withdrawing these selected characteristics, a positive side waveform of the U-phase can be reformed. Then, to obtain a negative side waveform of the range of 180°–360° in electrical angle, the respective characteristics selected as described above have only to be inverted. Then, by shifting this waveform of the U-phase by every 120° in electrical angle, a three-phase AC waveform can be obtained. That is, by continuing to combine the above-described characteristics D0 through D5 according to a predetermined rule, the three-phase AC can be reformed.

Thus, in the method proposed in the Japanese Patent Application Laid-Open No. 46677/1982, the above-described six characteristics, that is, the waveforms D0 through D5 are stored in advance to be read out arbitrarily. This method can reduce the memory capacity to a considerable extent compared with the first prior art, not sufficiently. That is, in this second prior art, a part itself of the waveform of the three-phase sinusoidal wave is stored, and therefore the reduction in the memory capacity has a limit in view of compatibility with the resolution.

SUMMARY OF THE INVENTION

Therefore, the principal object of the present invention is to provide an inverter apparatus of PWM system capable of further reducing the memory capacity.

Another object of the present invention is to provide an inverter apparatus capable of reducing the memory capacity without sacrificing the resolution.

In accordance with the present invention, data of patterns of combinations of ON or OFF state, that is, "1" or "0" of the respective switching elements of the bridge circuit obtained by the PWM theory are stored in a first memory means. The pattern is read out and maintained for a required time period based on the time data stored in another memory means or evaluated by calculation. Then, this pattern and the holding time thereof are changed-over properly, and thereby a continuous switching signal is given to respective switching elements, and a continuous AC output is obtained from the bridge circuit.

In accordance with the present invention, some limited number of patterns of combinations of ON or OFF state, that is "1" and "0" of respective switching elements and the data associated with the time during which the pattern is to be held have only to be stored, and therefore the memory capacity can be reduced to a great extent compared with any one of the prior arts. Furthermore, the resolution or precision of the PWM output, that is, the resolution or precision of the sinusoidal wave to be obtained can be determined arbitrarily by the time during which the pattern is to be held (holding time), and therefore no increase in the memory capacity element is required to improve the resolution, and accordingly, a high resolution of or a high precision of output is obtainable with a less memory capacity than prior arts.

Meanwhile, the data of the time during which the pattern is to be held may be stored intact in a memory means such as ROM. However, in order to further reduce the memory capacity, preferably, only the initial value of the holding time and required predetermined numeric values are stored in advance, and a proper operation is performed based on these numeric values. In this case, if different numeric values are stored in advance according to the ratio of output voltage to output frequency, that is V/F, an AC output of optimum V/F matching with the characteristic of the load can be obtained.

In a preferred embodiment in accordance with the present invention, the inverter apparatus is utilized to drive an induction motor for driving a compressor of an outdoor unit of an air-conditioning system. Also, the holding time is counted by a hardware timer. Then, the microprocessor controlling the inverter performs another processing, for instance, control of defrosting of the outdoor unit while the timer is operated, that is, until the timer period set in the timer expires. In accordance with the preferred embodiment, an advantage is obtainable that not only the inverter but also the defrosting operation can be controlled by one microprocessor in contrast with that the conventional air-conditioning system requires another microprocessor or a control means to control defrosting only.

These objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 7 is a pattern table representing ON or OFF state of switching transistors in accordance with an embodiment of the present invention.

FIG. 8 is a state transition table showing transition of the states during one cycle of a three-phase AC in accordance with the embodiment of present invention.

FIG. 9 is a time table showing the holding time for each period as shown in FIG. 8 on a frequency basis.

FIG. 11 is a schematic block diagram showing one embodiment in accordance with the present invention although the bridge circuit is not shown.

FIG. 14 is a table showing predetermined numeric values for calculating the holding time based on FIG. 13 embodiment.

FIG. 16, FIG. 18, FIG. 19 and FIG. 20 are time tables showing the holding time in the cases of V/F≈0.5, V/F≈1.0, V/F1.5 and V/F≈2.0, respectively.

FIG. 17 is a table showing predetermined numeric values for calculating the holding time according to V/F which are used for the FIG. 15 embodiment.

FIG. 21 is an initial values table showing the initial value of the holding time for each V/F which is used for FIG. 15 embodiment.

FIG. 22 is a schematic block diagram showing one example of a controller.

FIG. 25 is a flow chart for schematically explaining operation of the timer of an embodiment in accordance with the present invention.

DESCRIPTION OF THE PREFERRED EMBODIMENTS

Figure 4:
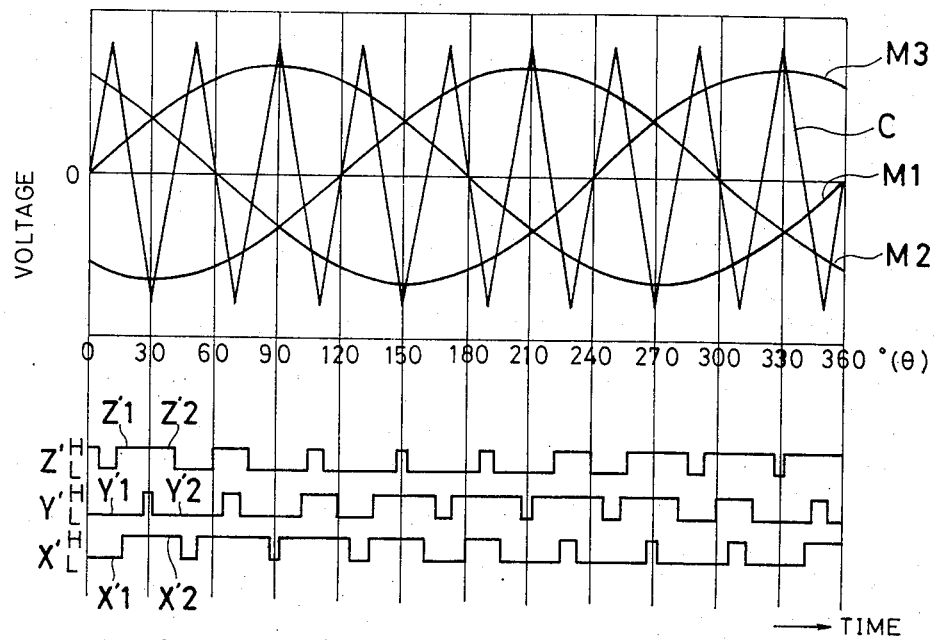
FIG. 4 is a waveform graph for explaining the principle of the present invention.
Figure 5:
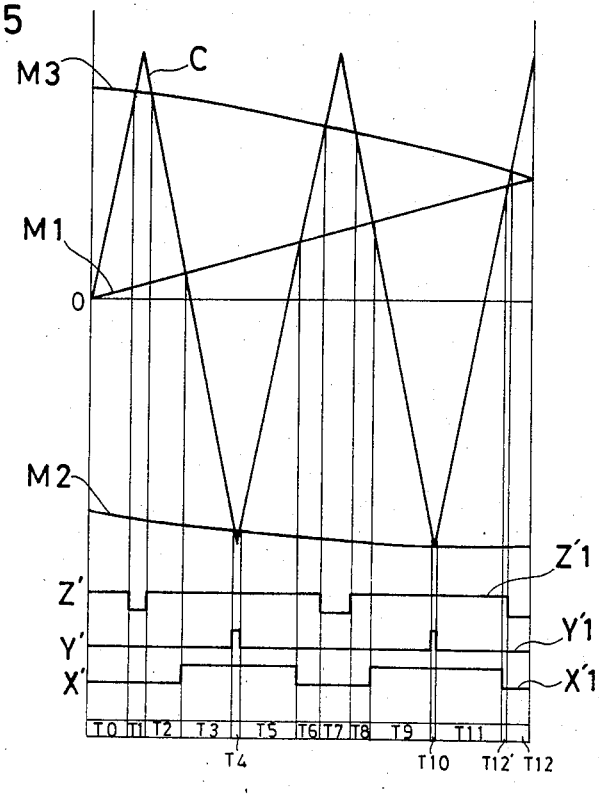
FIG. 5 is a magnified illustrative view showing the range of 0°–30° in electrical angle of FIG. 4.

FIG. 4 and FIG. 5 are waveform graphs for explaining the principle of the present invention. These FIG. 4 and FIG. 5 show carrier waves designated by a reference symbol C and modulation waves which are designated by reference symbols M1, M2 and M3 and phases thereof shift from one another by 120°. And, in this example, Cf (carrier wave frequency) and Mf (modulation wave frequency are) in a constant relationship. That is to say, they are selected to meet the following relationship, Cf/Mf=6n−3(n=1. 2. 3. · · · ).

As is well known, in the PWM system, the switching signal for turning on or turning off each switching transistor of the bridge circuit is obtained by comparing the carrier wave with the modulation wave. A switching signal X′ is obtained by comparing a carrier wave C with a modulation wave M1, a switching signal Y′ is obtained by comparing the carrier wave C with a modulation wave M2, and a switching signal Z′ is obtained by comparing the carrier wave C with a modulated wave M3. The switching signals X′, Y′ and Z′ are given to base terminals X, Y, and Z of the switching transistors Q1, Q2 and Q3, respectively. Meanwhile, explanation of switching signals $\overline{X}'$, $\overline{Y}'$, and $\overline{Z}'$ is omitted here since they are obtained only by inverting the switching signals X′, Y′ and Z′.

A three-phase AC as shown in FIG. 4, as is obvious from FIG. 4, can be formed by properly combining components within the range of 0°–30° in electrical angle, that is, parts of the modulation waves M1, M2 and M3. This holds likewise for the switching signals X′, Y′ and Z′ (and $\overline{X}'$, $\overline{Y}'$ and $\overline{Z}'$) which are obtained by comparing the carrier wave with the modulation waves. For example, taking waveforms of the switching signals X′ Y′ Z′ during the range of 0°–30° in electrical angle as X′1, Y′1 and Z′1, waveforms of the switching signals during the range of 30°–60° in electrical angle, X′2, Y′2 and Z′2 correspond to a waveform traced reversely the waveform Z′1, a waveform traced reversely the waveform Y′1 and a waveform traced reversely the waveform X′1, respectively. Thus, hereafter, by a proper conversion such as "reverse tracing", "inverting" or the like of the waveforms of the switching signals X′1, Y′1 and Z′1, the switching signals X′, Y′, and Z′ ($\overline{X}'$, $\overline{Y}'$, and $\overline{Z}'$) can be obtained over one cycle, that is the range of 0°–360° in electrical angle.

Figures 6, 10:
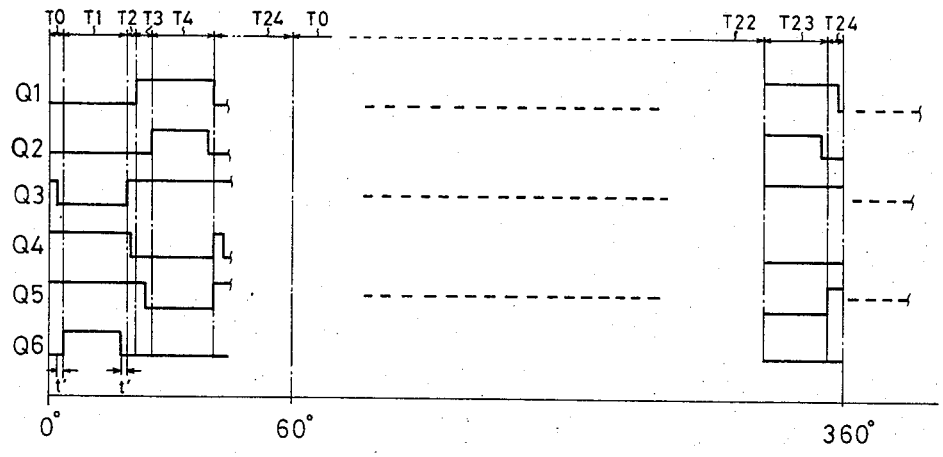
FIG. 6 is an ON/OFF table showing ON and OFF states of respective switching transistors on a period basis in the case where the bridge circuit in FIG. 1 is employed in the present invention.
FIG. 10 is a waveform graph showing switching signals (ON/OFF) given to respective switching transistors constituting the bridge circuit in the case where the set frequency is 20 Hz.

FIG. 5 is a magnified view of the range of 0°–30° in electrical angle in the case of Cf/Mf=27 according to FIG. 4. FIG. 5 shows periods during which the states of the switching signals X′1, Y′1 and Z′1 are held by periods T0 to T12, respectively. Assuming that when the switching signal is of high level, that is, "1" the corresponding switching transistor is in ON state, ON or OFF states of the switching transistors Q1 through Q6 in FIG. 1 during each time period become as shown in FIG. 6. For example, during a time period T0, the switching transistors Q1, Q2 and Q6 are OFF states, and the switching transistors Q5, Q3, and Q4 are ON states.

Meanwhile, in FIG. 5, according to the results of experiments conducted by the inventors, it was seen that a period T12′ is always a very short time even when the voltage ratio of carrier wave to modulation wave is changed variously. Accordingly, considering the whole range of 0°–30° in electrical angle, the period T12′ is an extremely short time, and accordingly no problem takes places in the overall operation of the inverter even if this period T12′ is omitted. Therefore, this period T12′ is omitted in explanation of FIG. 6 and thereafter.

Figures 1, 2:
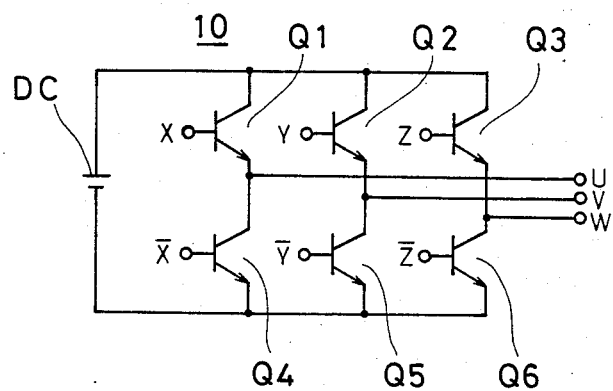
FIG. 1 is a circuit diagram showing a bridge circuit of an inverter apparatus which is the background of the present invention and thereto the present invention is applicable.
FIG. 2 is an illustrative view showing an address map of ROM for explaining a first prior art.
Figure 3:
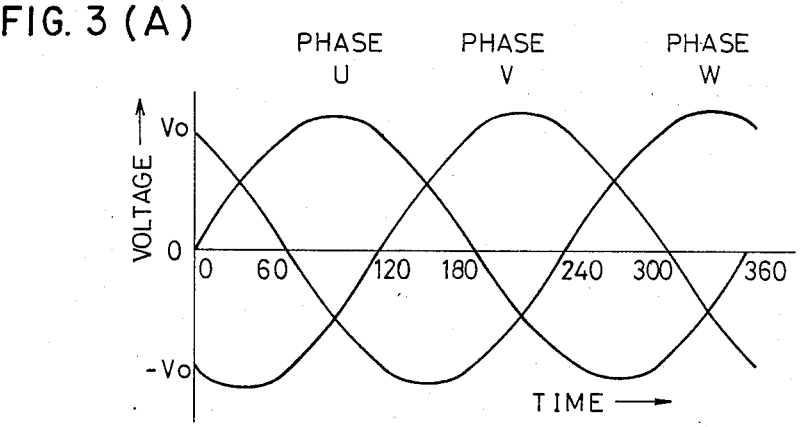
FIGS. 3a, b & c are a waveform graph for explaining a second prior art.
Figure 3:
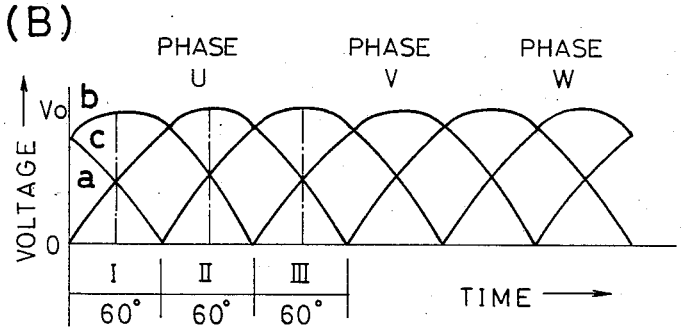
Figure 3:
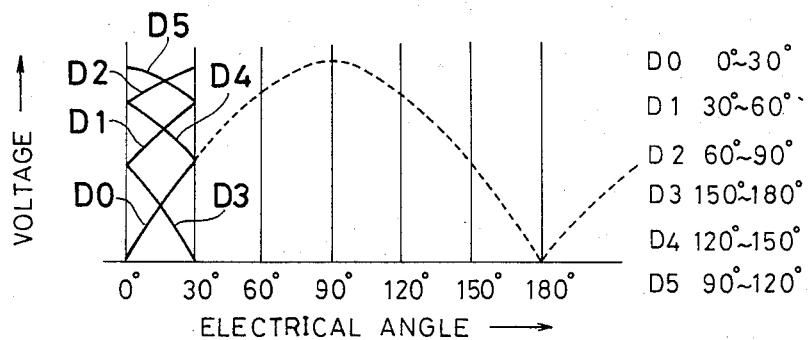

As is obvious from FIG. 6, during the periods T0, T2, T6 and T8, states of the switching transistors Q1, Q2, Q3, Q4, Q5 and Q6 likewise, become OFF, OFF, ON, ON, ON and OFF, and the ON/OFF patterns are the same. Also, the periods T1, T7 and T12 have the same ON/OFF pattern. The time periods T3, T5, T9 and T11 have the same ON/OFF pattern, and the periods T4 and T10 also have the same ON/OFF pattern. Thus, within the range of 0°–30° in electrical angle, there are only four kinds of ON/OFF patterns of the transistors Q1 through Q6 (FIG. 1). Accordingly, even when respective inversions are taken into account, the patterns include only eight kinds.

Thus, the patterns of combinations of ON/OFF states of the switching transistors Q1 through Q6 are limited to a small constant number. The inventors found this quite originally and applied this to complete the present invention.

Representing the patterns of the transistors Q1 through Q6 with "1" for ON and "0" for OFF, states wherein each switching transistor can be put become as shown in FIG. 7. In FIG. 7, patterns P0 through P7 are basic ON/OFF patterns of the switching transistors Q1 through Q6 shown in FIG. 1. And, in FIG. 7, patterns P8 through P25 are ON/OFF patterns during the so-called transitional period. Meanwhile, the states of the switching transistors Q4, Q5 and Q6 in the patterns P0 through P7 are inversions of the states of the transistors Q1, Q2 and Q3, respectively.

For example, when the period is changed-over from T0 to T1 in FIG. 5, the states of the switching transistors Q1 through Q6 are changed-over from the pattern P0 to the pattern P6 in FIG. 7. More specifically, the switching transistor Q3 is turned from ON to OFF, and the switching transistor Q6 is turned from OFF to ON. If the change-over is made instantaneously, the switching transistors Q3 and Q6 are put in ON state simultaneously, although instantaneously, at the time of change-over. Generally, when such a bridge circuit is employed, at least one of switching transistors connected to a branch or current path has to be put inevitably in OFF state. The reason is that when all of them are put in ON state, the current path is put in a short-circuit state, and, for example, the switching transistors Q3 and Q6 are broken. This is caused by the switching characteristic of the switching transistor, and primarily caused by a time delay of operation due to discharge of stored charge when shifting from ON state to OFF state. On the other hand, for example, in changing-over from the pattern P0 to the pattern P6, if the change-over is made such that the pattern P0→ the transitional pattern P8→ the pattern P6, short-circuits of transistors Q3 and Q6 do not take place (refer to the range of 0°–60° in electrical angle in FIG. 8).

Meanwhile, by improving the switching characteristics of the switching transistors Q1 through Q6 so that the switching transistors can be changed-over instantaneously from ON state to OFF state, for example, by adding a discharge circuit or the like, interfacing of such transitional patterns P8 through P25 between changes of the basic patterns P0 through P7 can be dispensed with.

Thus, by combining the basic patterns P0 through P7 and the transitional patterns P8 through P25, an ON/OFF pattern of the switching transistor over one cycle, that is 0°–360° in electrical angle can be obtained. FIG. 8 shows pattern changes representing ON/OFF states during one cycle of the switching transistors Q1 through Q6 thus obtained. FIG. 8 shows transition of the pattern (P) for every range of 0°–60° in electrical angle in the case where the range of 0°–30° in electrical angle of one cycle of AC as shown in FIG. 5 is divided into 12 periods, that is, the range of 0°–60° in electrical angle is divided into 25 periods. In addition, in FIG. 8, a mark "*" designates the period during which the transitional patterns P8 through P25 are to be utilized, that is, the transitional period.

Meanwhile, the ON/OFF patterns thus obtained are nearly the same independent of the frequency even when the frequency (F) is varied.

The present invention aims at obtaining a three-phase AC by means of the PWM system, for example, from the bridge circuit as shown in FIG. 1 by determining the states thus obtained, that is, the ON/OFF patterns of the switching transistors and the time during which the sate thereof are to be held (holding time).

FIG. 9 shows one example of such a holding time. This FIG. 9 shows respective holding times of period C0 through C24 in FIG. 8 on a frequency basis, including a time of about 10 μsec required for the transitional period. As is obvious from FIG. 4 to FIG. 5 as explained previously, all output waveform of one cycle, that is, the switching signal can be represented by the waveform of the range of 0°–30° in electrical angle, that is, the switching signal. Furthermore, the range of 0°–60° in electrical angle, that is, double the above range is symmetric around the axis of 30° in electrical angle. Accordingly, by arranging the periods C0, C1, - - -, C12 in FIG. 8 reversely in the sequence of periods C12, C11, - - - C0, the periods C13 through C24 can be obtained. A dotted arrow mark at the left end in FIG. 9 shows this matter. This means that when the holding time of each period in the range of 0°–30° in electrical angle is determined, the holding time of each period C0 through C24 (and the transitional period) of one cycle is also determined. Thus, the time of one cycle, that is, the output frequency is determined by a total of the holding times, and therefore the holding time is set for each frequency.

Meanwhile, in FIG. 9 an arrow mark "→" shows the same numeric value as the left one.

The ON/OFF patterns (P) of the switching transistors Q1 through Q6 as shown in FIG. 7 and the transitions thereof as shown in FIG. 8 are stored, and such patterns are made to maintain based on the holding time as shown in FIG. 9, and thereby ON and OFF of the transistors Q1 through Q6 can be controlled by the PWM system.

Brief explanation is made here after on an example of the range of 0°–60° in electrical angle. In the period C0 in FIG. 8, first the pattern P0 is determined based on FIG. 7, and the holding time of the period C0 in the table of FIG. 9 is set in the timer (not illustrated). Then, the switching signals responding to these patterns P0 through P5 are held until this timer expires. Meanwhile, the predetermined time of 10–20 μsec before end of this period C0 is the transitional time to the next period C1.

Next, when the timer expires, the switching signals are given to the transistors Q1 through Q6 based on the ON/OFF pattern P6 and the holding time thereof of the transistors Q1 through Q6 in the period C1. Hereafter, the switching signal is given so as to hold the pattern according to the respective holding time of the periods C2, C3, - - - C24. Then, when the range of 0°–60° in electrical angle ends, next the range of 60°–120° in electrical angle (FIG. 8) comes and similarly the patterns P0, P9, - - - are outputted in sequence according to the holding time in FIG. 9. Then, when the last transitional pattern P14 of the last range of 300°–360° in electrical angle has been outputted, a switching signal continuing for one cycle as shown in FIG. 10 can be obtained. Meanwhile, FIG. 10 shows the switching signal in the case where the output frequency is 20 Hz for an example.

FIG. 11 is a block diagram of one embodiment in accordance with the present invention. This inverter apparatus 11 includes, for example, a microprocessor such as the integrated circuit "TMS7040" manufactured by Texas Instruments. A CPU 12 contained in this inverter apparatus 11 comprises, for example, a RAM, an arithmetic logic unit and the like, and to this CPU 12, a first ROM 14 as a first memory, a second ROM 16 as a second memory and a third ROM 18 as a third memory are connected through a bus 20. The table of FIG. 7 as explained previously is stored in advance in the first ROM 14, the table of FIG. 8 in the second ROM 16 and the table of FIG. 9 in the third ROM 18, respectively. A frequency setting portion 22 comprises, for example, a manual operation part, and the numerical values, that is, data corresponding to the frequency (F) set by operating this manual operation part are generated. A timer 24 connected to the bus 20 together with the frequency setting portion 22 counts the time during which the ON/OFF pattern, that is, the switching signal is to be held according to the table of FIG. 9. This timer is constituted, for example, as a countdown system. And, the output port of the CPU 12 is connected to the base terminals X, Y, Z, $\overline{X}$, $\overline{Y}$, and $\overline{Z}$ of the respective switching transistors Q1, Q2, Q3, Q4, Q5 and Q6 in the bridge circuit 10 as shown in FIG. 1 through an appropriate driving circuit (not illustrated).

Meanwhile, a ROM 26 in FIG. 11 is used in an embodiment as described later.

Figure 12:
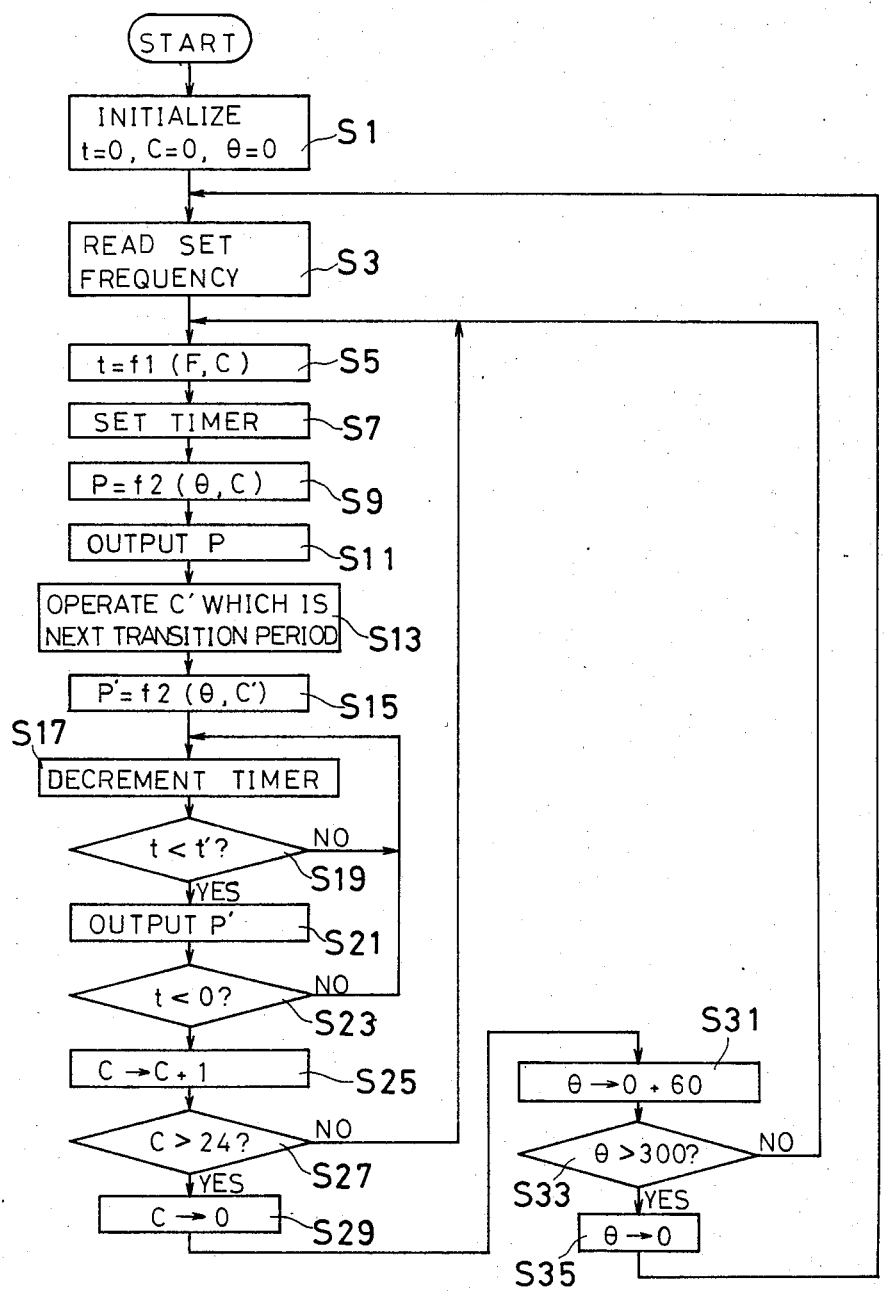
FIG. 12 is a flow chart for explaining operation of one embodiment in accordance with the present invention.

Next, a general description is made first on operation of this embodiment in reference to FIG. 12, being followed by specific description thereon.

In the first step S1 in FIG. 12, the CPU 12 (FIG. 11) initializes the associated parts. That is to say, in this step S1, a set time (t) of the timer 24 is set to zero, and also a variable (C) representing the period in FIG. 8 and a variable ($\theta$) representing the electrical angle are set to zero, respectively. Note that the variable ($\theta$) representing the electrical angle indicates "$\theta \leq \theta < \theta + 60°$", and $\theta = 0$ indicates $0° \leq \theta < 60°$, $\theta = 60$ indicates $60° \leq \theta < 120°$, - - - and $\theta = 300$ indicates $300° \leq \theta < 360°$, respectively (refer to FIG. 8).

In the next step S3, the CPU 12 reads the data of frequency (F) from the frequency setting portion 22 through the bus 20.

In the following steps S5 and S7, the CPU 12 evaluates the time to be set in the timer 24, and sets it in the timer 24. Meanwhile, the set time (t) can be evaluated by the data of the frequency (F) and the period (C) in reference to FIG. 9. In other words, this set time (t) can be obtained from "t=f1(F,C)". The time thus obtained is set in the timer 24 for each period (C).

In the next step S9, the CPU 12 obtains the data of the ON/OFF pattern (P) of each switching transistor Q1 through Q6. That is, this ON/OFF pattern (P) can be obtained for each period in reference to FIG. 7 and FIG. 8. First, in FIG. 8, the pattern at that time is obtained based on the period (C) and subsequently, in FIG. 7, the content of the pattern obtained is determined, for example "001110" for the pattern P0. Thus, the pattern (P) can be evaluated from "P=f($\theta$,C)". Then, the CPU 12 outputs the data of the pattern (P), that is, the switching signal to the output port thereof, that is, the base terminals X through $\overline{Z}$ of respective transistors Q1 through Q6 (in the step 11).

In the following two steps S13 and S15, processing associated with the transitional period as shown in FIG. 8 is executed. First, in the step S13, a transitional period (C') is determined which is required when changing to the next period, that is, when the variable (C) representing the period changes to (C+1). For example, in the case where transition is made from the period C0 to the period C1, the pattern P8 in a second column from the left in FIG. 8 can be used. Then, in the step S15, a transitional pattern (P') in that period C' is obtained in reference to FIG. 7. This transitional pattern (P') also can be evaluated from "P'=f2($\theta$,C')" based on the electrical angle $\theta$ and the period C'.

Thereafter, in the step S17, decrement of the timer 24 (FIG. 11) is started. When it is decided that the residual time of the timer has become the transitional period (C'), that is, a time (t') required for the transitional pattern (P'), for example, 10-20 $\mu$sec in the step S19, the CPU 12 outputs the pattern (P') in the next step S21. Responsively, the switching transistors Q1 through Q6 are changed-over from the state according to the basic pattern to the state according to the transitional pattern.

In the next step S23, decision is made on whether or not the time (t) set previously in the step S7 has elapsed. If the set time (t) has elapsed, the variable (C) representing the period is incremented to become "C+1" in the next step S25. Subsequently, in the step S27, decision is made on whether or not the newly set period (C) is "24" (refer to FIG. 8) or less. If "C$\leq$24", the processing returns to the previous step S5, and the set time (t), the basic pattern (P) and the transitional pattern (P') are evaluated again, and that state is held until the time set by the timer 24 elapses.

If C>24 is detected in the step S27, the variable (C) representing the period is set to zero (step S29).

Decision of "YES" in the step S27 indicates that the first range of 0°-60° in electrical angle has ended, and accordingly, the CPU 12 increments the variable ($\theta$) representing the electrical angle to set to "$\theta=\theta+60$" in the next step S31. Responsively, the variable ($\theta$) is set to the range of 60°$\leq \theta <$120° as shown in FIG. 8. After such a renewal of variable ($\theta$), decision is made on whether or not the electrical angle has gone beyond the last range of 300°-360°, that is, $\theta >$300° in the step S33. If "NO" is decided in the step S33, the previous step S5 and the following respective steps are executed again.

Then, when all the range of 0°-360° in electrical angle, that is, one cycle is completed, "YES" is decided in the step S33, and in the step S35 the variable ($\theta$) representing the electrical angle is set to zero, and thereafter the processing returns to the previous step S3.

Thus, the change processing of respective variable (C) and ($\theta$) is performed each time, and thereafter the data of the frequency (F) is read again, and the same operation is repeated. Accordingly, when the set frequency is changed, the frequency of the AC output from the bridge circuit is changed from the time when the data (F) is read, that is, when the step S3 is executed first after that.

To be described more specifically, first, a case is supposed where, for example, the frequency F=20 is set in the frequency setting portion 22 (FIG. 11). In this case, the CPU 12 first reads the holding time "t=132" in FIG. 9 from the third ROM 18 based on the values of "F=20" and "C=0". This time 132 $\mu$sec is set in the timer 24 by the CPU 12.

Subsequently, respective ON/OFF patterns (P0) of the switching transistors Q1 through Q6 are obtained based on "$\theta=0$" and "C=0" in reference to the second ROM 16 and the first ROM 14, being outputted. This pattern P0 is "001110" as in the case with the timing at 0° in the electrical angle of FIG. 10.

Thereafter, the timer 24 starts decrement, and this state is held until the residual time of this timer 24 becomes (t'). Then, the period of the second half time t' ($\mu$sec) of the subdivided period T0 in FIG. 10 is the holding time of the transitional period as described previously (shown by the mark * in FIG. 8). Accordingly during this time t', the pattern (P8) is outputted as "000110" so that the transistors Q1 through Q6 will be turned to OFF, OFF, OFF, ON, ON and OFF, respectively.

When the timer 24 counts 132 $\mu$sec, the CPU 12 sets the variable (C) representing the period to C=1, thereafter outputting the ON/OFF pattern (P6) during "668-t"$\mu$sec. Then, the CPU 12 outputs the pattern (P8) during the second half of this holding time t'$\mu$sec, thereafter outputting the pattern (P0) of the period C2 during "108-t"$\mu$sec. Thereafter in the same manner, the ON/OFF patterns and the holding times thereof are controlled in sequence, and the processing is executed up to 300°-360° in electrical angle, and thereby the ON/OFF signals (refer to FIG. 10) of the switching transistors Q1 through Q6 during one cycle, that is, 0°–360° in electrical angle can be obtained (refer to FIG. 10).

Thus, when the AC of 20 Hz is obtained from the output of the bridge circuit, if the set value is changed by the frequency setting portion 22, the value of frequency read into the CPU 12 changes from the change point of data of that frequency after 360° in FIG. 10, and therefore the operation as described above is repeated thereafter responding to the changed set frequency.

Thus, in accordance with the present embodiment, a continuous AC output by means of the PWM system is obtainable with a very smaller memory capacity compared with those of the conventional methods. Also, in the case of such an inverter apparatus, the resolution of output is determined by the time precision of the holding time in FIG. 9. Therefore, in accordance with the present embodiment, no increase in the memory capacity is required to improve the resolution unlike the conventional methods, and therefore a high resolution of inverter can be easily constituted.

In the above-described embodiment, the holding time of each period for each frequency is all stored in a memory means such as ROM as in the case with the table as shown in FIG. 9. Accordingly, the memory capacity becomes smaller than the conventional ones, but is not enough. Then, in the next embodiment, such a holding time is evaluated by operation.

Figure 13:
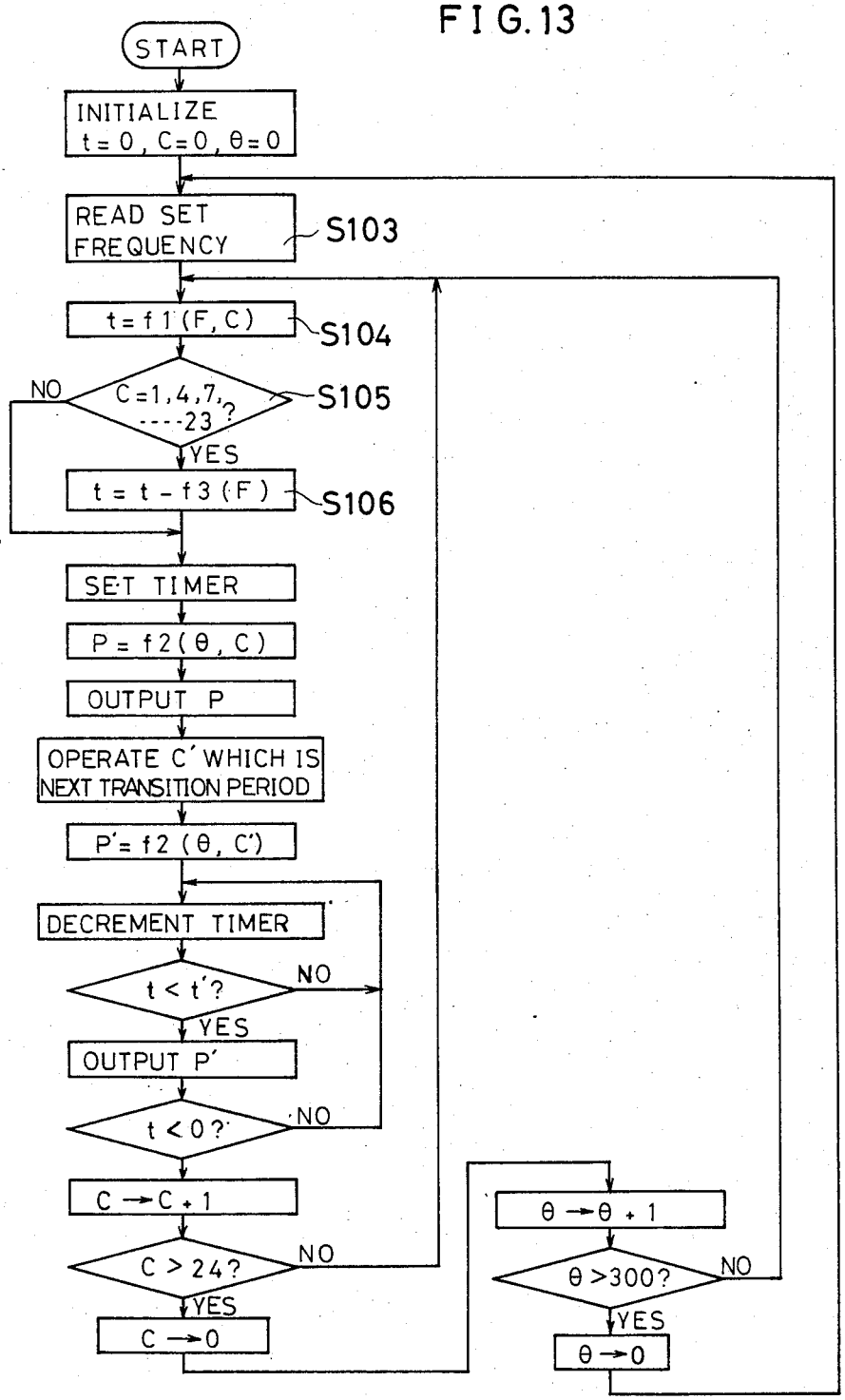
FIG. 13 is a flow chart for explaining operation of another embodiment in accordance with the present invention.

FIG. 13 is a flow chart for explaining operation of another embodiment in accordance with the present invention. The present embodiment differs from FIG. 12 embodiment in that it discriminate between intact-use of the numeric value read from the third ROM 18 as the holding time (t) and evaluation by operation to obtain the holding time (t) in steps S104–S106. Accordingly, here, description omitted on the steps wherein the same operation as FIG. 12 embodiment is performed, being made in detail only on featured parts of the present embodiment.

Meanwhile, in the present embodiment, only the initial value of the holding time is stored in advance in the ROM 18 in FIG. 11, while a predetermined numeric value "f3(F)" required for operation as shown in FIG. 14 is stored here for each frequency by newly utilizing another ROM 26.

In the step S104 of FIG. 13, the CPU 12 (FIG. 11) reads an initial value "t=f1(F,C)" of the holding time from the third ROM 18 based on the variable (C) representing the period. Then, in the next step S105, the CPU 12 decides whether or not the period (C) is the period set in advance. These "Periods set in advance" are C1, C4, C7, C10, C12, C14, C17, C20 and C23 in FIG. 9.

As is obvious from FIG. 9, the holding time for each set frequency is constant independent of the set frequency in the periods C0, C2, C3, C5, C6, C8, C9, C11, C13, C15, C16, C18, C19, C21, C22 and C24 other than the specific periods. Accordingly, in such a period, the initial value of the holding time stored in the third ROM 18 (FIG. 11), that is "t=f1(F,C)" has only to be used intact. On the other hand, in the specific periods as enumerated previously C1, C2, - - - C23, the holding time can be calculated by subtracting the predetermined numeric value for each frequency as shown in FIG. 14 set in advance in the fourth ROM 26 in FIG. 11 from the initial value thereof.

Then, in the step S105, when it is decided that the period is the above-mentioned period set in advance, the CPU 12 evaluates the holding time (t) based on "t=t−f3(F)", that is, "t=f1(F,C)−f3(F)". In the equation, "f3(F)" is a predetermined number determined for each set frequency read in the step S103. For example, it is "154" in the case of R=24 and "264" in the case of F=28.

Meanwhile, if "NO" is decided in the step S105, the processing proceeds intact to the following step.

To be described more specifically, for example, the case where the set frequency is 20 Hz, first the ON/OFF pattern "001110" equivalent to the pattern P0 in the period C0 in the range of 0°–60° in electrical angle is read from the first ROM 14 (FIG. 11) based on FIG. 7 and FIG. 8. Then, for example, the initial value 132 μsec of the holding time (t) read from the third ROM 18 (FIG. 11) is set in the timer 24 (FIG. 11). The states of the respective switching transistors Q1 through Q6 of the bridge circuit 10 are held intact until this timer 24 expires. Then, after a lapse of the transitional time (t'), when the timer 24 counts the set time (t), the CPU 12 subsequently read the ON/OFF pattern "000110" equivalent to the pattern P8 in the period C1 in the range of 0°–60° in electrical angle.

Since the period C1 is the above-described period set in advance, operation of "668−0=688" is performed based on the initial value "668" set in the third ROM 18 (refer to FIG. 9) and the predetermined numeric value "f3(F)=0", and the switching transistors Q1 through Q6 are controlled with the resulting "668 μsec" set as the holding time (t).

Next, in the case where the set frequency (F) is 24 Hz, in the period C0, the ON/OFF pattern of the pattern P0 is read from the first ROM 14 based on FIG. 7 and FIG. 8, and further the initial value 132 μsec of the holding time read from the third ROM 18 is set in the timer 24. Then, when this timer 24 expires, the ON/OFF pattern of the pattern P8 in the next period C1 is read from the first ROM 14. Then, to evaluate the holding time (t), operation of "668−154=514" is executed based on the initial value "668" of the holding time set in the third ROM 18 and the predetermined numeric value "154" (refer to FIG. 14) set in the fourth ROM 26. The result of this operation 514 μsec is set in the timer 24 as the holding time.

Hereafter, only in the case of the periods C4, C7, C10, C12, C14, C17, C20 and C23, the holding time is calculated each time by subtracting the predetermined numeric value, for example, "154" when the frequency is 24 Hz from each initial value (refer to FIG. 9).

Next, for example, in the case where the frequency is 28 Hz, the predetermined numeric value "f3(F)" in the previous equation becomes "264", and this numeric value is subtracted from the initial value as shown in FIG. 9 to evaluate the holding time (t).

Thus, the different predetermined numeric value f3(F) is set in advance for each set frequency, and the holding time is operated for specific periods. Thereby, a continuous switching signal as shown in FIG. 10 can be obtained with a smaller memory capacity compared with that of the previous embodiment.

Generally, in the inverter apparatus, the ratio of the voltage to the output frequency, that is V/F is required to be set to an optimum value according to the characteristic of the load driven by it. Then, hereinafter, description is made on an embodiment wherein the value of V/F can be set arbitrarily.

Figure 15:
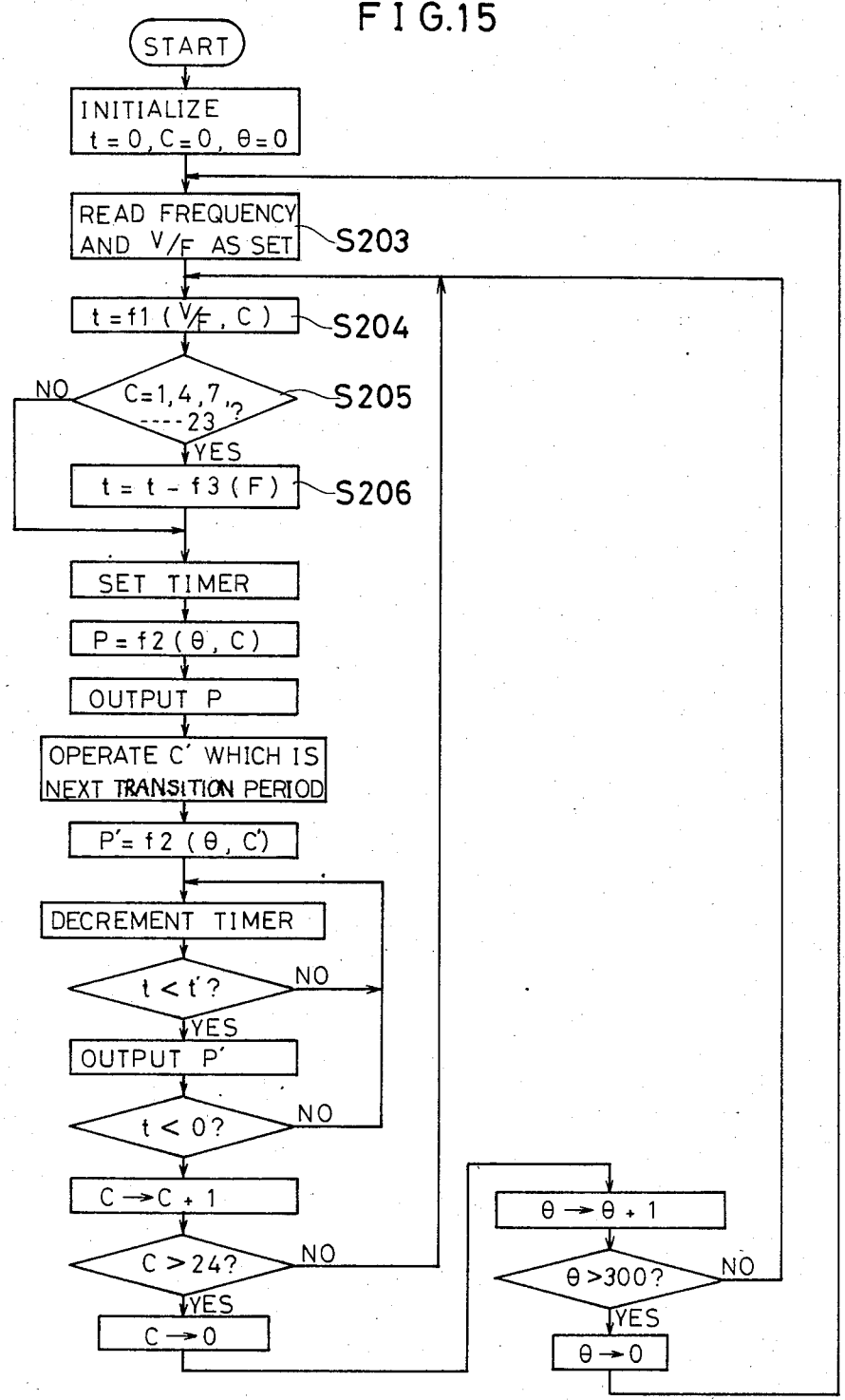
FIG. 15 is a flow chart for explaining operation of determining the holding time according to V/F of still another embodiment in accordance with the present invention.

FIG. 15 is a flow chart for explaining still another embodiment in accordance with the present invention. The present embodiment differs from the previous FIG. 13 embodiment in that for the holding time (t) a value responding to V/F is read or operated in the steps S203–S206.

More specifically, for example, in the case where in AC output of set frequency=10 Hz and V/F≈0.5 is obtained, first, the initial value 28 μsec of the holding time of the first period C0 is read based on the table in FIG. 15 stored in advance in the third ROM 18 (FIG. 11) to be set in the timer 24 (FIG. 11). Then, after a lapse of the predetermined transitional time (t'), the CPU 12 reads the ON/OFF pattern (P) and the holding time (t) in the next period C1 from the first ROM 14 and the third ROM 18. However, this period C1 is the "specific period" described in the previous FIG. 13 embodiment, and therefore the CPU 12 evaluates the holding time (t) of that period by substracting the predetermined numerical value "f3(F)" from the initial value thereof in the step S206.

FIG. 17 shows such predetermined numeric values for such calculation. For example, in the case of F=10 and V/F≈0.5, for the holding time of the period C1, "1798−0=1798" μsec is given by using the initial value "1798" in FIG. 16 and the predetermined numeric value "0". In the case where F=20 and V/F≈0.5 are set, the holding time of this period C1 can be obtained by a similar subtraction "1798−926=872" μsec. Thus, it will be understood that the holding times of the respective periods C1, C4, C7, - - -, C23 can be calculated in response to V/F.

Figures 20, 25:
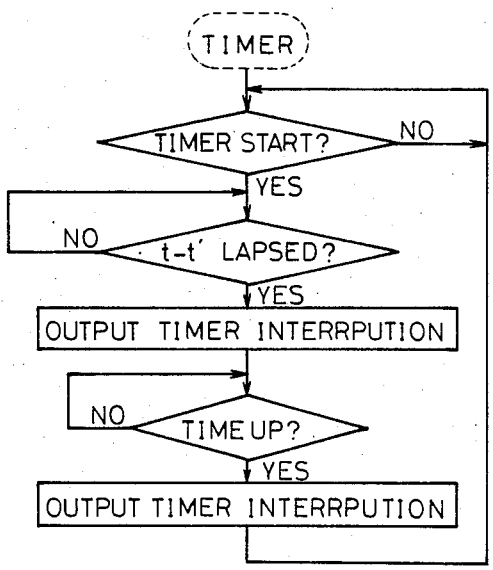

FIG. 18, FIG. 19 and FIG. 20 show the initial values of the holding times to be stored in the third ROM 18 in the cases of V/F≈1.0, V/F≈1.5, and V/F≈2.0, respectively. As is obvious from FIG. 16 and FIG. 18 through FIG. 20, the holding times of all the periods can be evaluated by the initial value for each V/F as shown in FIG. 21 and the predetermined numeric value "f3(F)" as shown in FIG. 17. Accordingly, tables as shown in FIG. 16 and FIG. 18 through FIG. 20 are not required to be fully stored. Accordingly, a large extent of reduction in memory capacity becomes possible.

The above-described inverter apparatus in accordance with the present invention is, in the concrete, employed advantageously, for example, for the air-conditioner and the refrigerator.

For example, in the conventional air-conditioners, as shown in FIG. 22, an output voltage of a temperature sensor 28 for detecting the room temperature (for example, this consists of a thermistor having negative characteristic) is given to a frequency controller 29. On the other hand, a voltage output of a temperature setter 30 for manually setting the room temperature (for example, this consists of a variable resistor) is given to this frequency controller 29. When a large difference exists between the two given voltages, from the frequency controller 29, a frequency setting signal is outputted to the inverter apparatus 11 to set a higher frequency. In reverse, when the difference between the both is small, the frequency setting signal is given to the inverter apparatus 11 from the frequency controller 29 to operate the inverter apparatus, that is, the air-conditioner at a lower frequency. Then, the inverter apparatus 11, as is described previously, outputs the switching signal to the switching transistors Q1 through Q6 of the bridge circuit 10 as shown in FIG. 1 in response to the given frequency setting signal (this is similar to the signal from the frequency setting portion 22 in FIG. 11). Responsively, a resolution number of the compressor (not illustrated) contained in the air-conditioner is controlled based on the output frequency of the inverter apparatus 11.

In the conventional air-conditioner as shown in FIG. 22, when microprocessors are used, two microprocessors are required for the frequency controller 29 and the inverter apparatus 11, respectively. Also, in such an air-condit ioner, a defrost sensor (not illustrated) is installed associated with a heat exchanger of the outdoor unit, and another microprocessor other than for the inverter apparatus is required also to control the defrosting circuit based on the signal from this defrost sensor. Peripheral circuits are required for such microprocessors, respectively. On the other hand, in order to apply to the electric equipment such as the air-conditioner used for general households, simplification of maintenance and cost reduction by means of miniaturatization of the system and reduction in the number of parts are severely required.

The next preferred embodiment can solve such problems. It is pointed out in advance that in this case, any one of the controlling methods in the previous FIG. 12, FIG. 13 and FIG. 15 may be employed.

Figure 23:
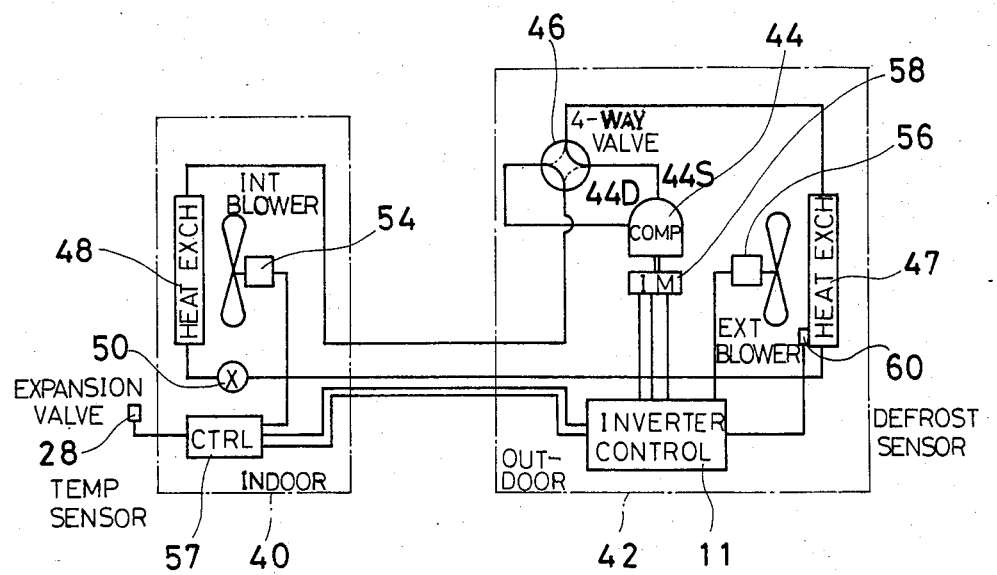
FIG. 23 is a schematic diagram showing one example of the air-conditioner.

FIG. 23 is a configuration view showing one example of the air-conditioner to which the present invention is applicable. The present embodiment is a separate type air-conditioner comprising an indoor unit 40 and an outdoor unit 42. A compressor 44, a four-way valve 46, and an outdoor heat exchanger 47 which are built in the outdoor unit 42 and an indoor heat exchanger 48 and an expansion valve 50 which are built in the indoor unit 40 are connected in a loop fashion using the piping for refrigerant, thereby constituting a refrigerating cycle. An indoor blower 54 is installed associated with the heat exchanger 48 in the indoor unit 40, and an outdoor blower 56 is installed associated with the heat exchanger 47 in the outdoor unit 42.

In the indoor unit 40, a controller 57 for outputting frequency data and the like is installed to change the capacity of the compressor 44 based on the temperature data from the temperature sensor 28. This controller 57 contains no microprocessor, and, for example, an A–D converter is simply employed.

Furthermore, the compressor 44 built in the outdoor unit 42 is driven by a three-phase induction motor 58, and this motor 58 is driven by an AC output by means of the PWM system from the bridge circuit 10 (FIG. 1). In addition, a defrost sensor 60 is installed associated with the heat exchanger 47 of the outdoor unit 42, and this defrost sensor 60 detects the amount of frost deposited on the heat exchanger 47.

Meanwhile, in the present embodiment, the microprocessor contained in the inverter apparatus 11 not only controls the output thereof, but also operates the defrosting circuit based on the signal from the defrost sensor 60.

When performing heating operation in such an air-conditioner, the four-way valve 46 is changed-over to the position as shown by a solid line in FIG. 23. Then, a refrigerant gas of high temperature and high pressure discharged from a discharge port 44D of the compressor 44 is condensed in the heat exchanger 48 of the indoor unit 40 through the four-way valve 46. At this time, by operating the blower 54, the room can be heated by the condensation heat of this refrigerant gas. Then, the refrigerant passing through the heat exchanger 48 evaporates in the heat exchanger 47 of the outdoor unit 42 through the expansion valve 50. Then, this evaporated refrigerant gas is sucked in from a suction port 44S of the compressor 44 through the four-way valve 46. In the freezing cycle having such a heat pump action, the temperature of the refrigerant rises due to evaporation of the refrigerant, that is, heat absorption from outdoor air, while the temperature of the outdoor side heat exchanger 47 falls. Frost is deposited on the surface of the heat exchanger 47 due to this fall in temperature and the refrigerant becomes difficult to evaporate, and therefore this amount of deposited frost is detected by the defrost sensor 60 and defrosting operation is performed.

Figure 24:
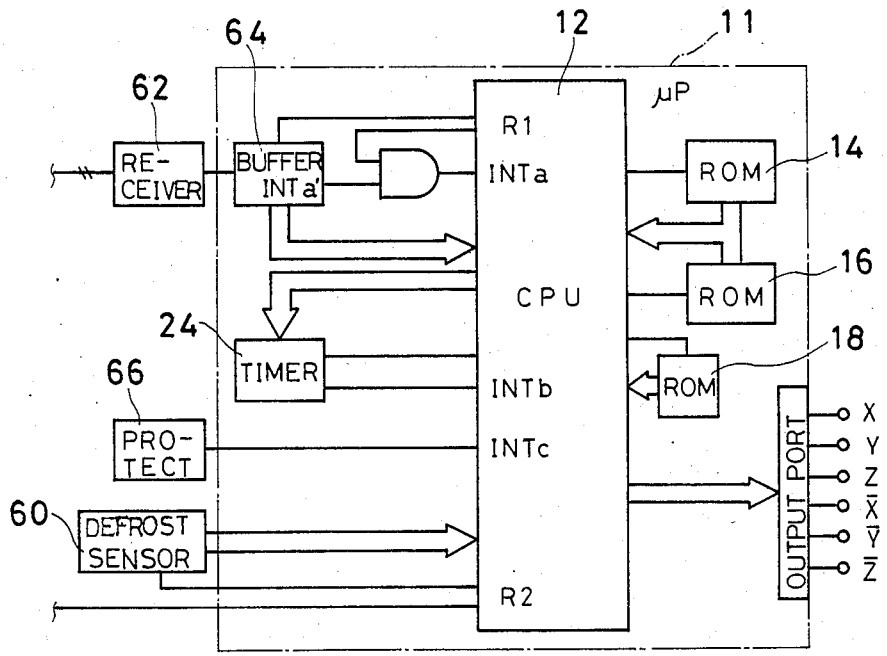
FIG. 24 is a block diagram of an inverter controller of FIG. 23 embodiment.

FIG. 24 is a block diagram showing a preferred embodiment of the inverter apparatus of FIG. 23 embodiment. The present embodiment employs the controlling method in FIG. 12. Meanwhile, in this FIG. 24, illustration of the bridge circuit (FIG. 1) constituting the inverter apparatus is omitted.

In association with the inverter apparatus 11, a receiver 62 is installed which receives the signal or data from the controller 57 built in the indoor unit 40, and the data received by this receiver 62 is stored temporarily in a buffer 64. From this buffer 64, the data is given to the CPU 12. This buffer 64 automatically stores the signal or data and outputs an internal interrupt signal to the CPU 12 from a terminal INTa' thereof. The ROMs 14, 16, 18 and the timer 24 are connected to the CPU 12 likewise the previous embodiment. Further to the CPU 12, the signal from the defrost sensor 60 and also the signal from a protecting circuit 66 are given.

This protecting circuit 66 outputs the signal, for example, when an abnormal heating takes place in the compressor 44 or when an overcurrent flows through the motor 58.

The timer 24 operates according to a flow chart as shown in FIG. 25. That is, the timer 24 counts the time lapse, for example, by the countdown system when the timer start command is given. Then, when "t-t'" elapses, a timer interrupt is outputted at that time. Meanwhile, such a timer interrupt is further outputted when the timer expires.

In the present embodiment, until such a timer interrupt signal is outputted, that is, during the timer 24 is counting the time lapse, the CPU 12 performs other controls.

Figure 26:
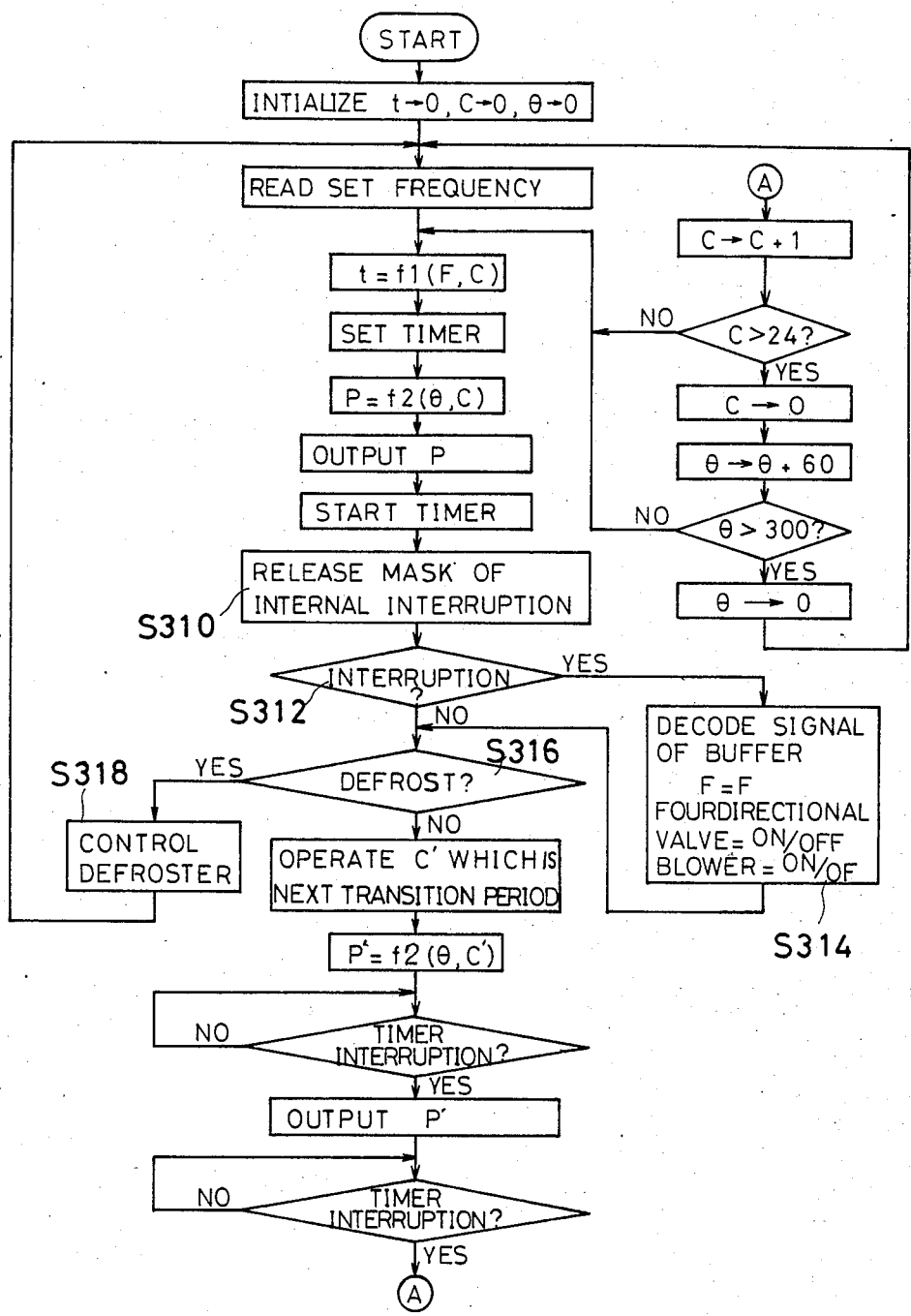
FIG. 26 is a flow chart for explaining a timer operation of a preferred embodiment in accordance with the present invention.

As shown in FIG. 26, after initialization in the first step, the switching transistors of the bridge circuit is controlled according to, for example, FIG. 12 as described previously. Meanwhile, description on control of the inverter is omitted here because of the same operation as the above-described. Then, the following operation is performed until the timer interrupt signal is outputted.

First, in the step S310, a voltage of high level is inputted from buffer 64 through a terminal R1 (FIG. 24) of the CPU 12, and thereby the mask of internal interrupt is released. At this time, if the internal interrupt signal is being outputted from the terminal INTa' of the buffer 64, the CPU 12 receives this signal at a terminal INTa thereof. Then, the CPU 12 reads the data or signal stored in the buffer 64 in response to the interrupt signal (in the step S312).

If the change-over signal of the four-way valve 46 or the ON/OFF signal of the blower 54 is outputted in response to an interrupt in the step S314, the states of the four-way valve 46 and the blower 54 are changed-over based on this signal by the CPU 12.

If no interruption takes place, the CPU 12 decides whether or not the defrosting operation is required based on the signal from the defrost sensor 60 in the step S316. If no defrosting is required, the CPU 12 outputs the transitional pattern (P') likewise in the previous step S15 in FIG. 12, and thereafter changes the variables (C) and ($\theta$), reads the set frequency (F) again, and repeats the same operation.

Then, in the case where the defrosting operation is required due to an increase in the amount of deposited frost, the CPU 12 controls the defrosting circuit in the step S318. This defrosting operation is made in the following manner. First, the defrost command signal is transmitted to the controller 57 built in the indoor unit 40 from a terminal R2 (FIG. 24) of the CPU 12. At this time, in the indoor unit 40, a display representing defrosting operation is performed, and, for example, controls such as stopping the blower 54 and the like are performed. In the outdoor unit 42, the four-way valve 46 is changed-over to the state as shown by a dotted line in FIG. 23, and the heat exchanger 47 is heated by the refrigerant of high temperature discharged from the discharge port 44D of the compressor 44 to be defrosted. Meanwhile, at this time, the revolution number of the compressor 44 may be kept constant, or may be changed in a stepwise-increase manner or the like. Then, when the frost deposited on the heat exchanger 47 of the outdoor unit 42 disappears, the defrost end signal is given to the controller 57 of the indoor unit 40 from the defrost sensor 60. Responsively, the CPU 12 changes-over the four-way valve 46 to the former state to return to the normal heating operation.

When a voltage of high level is given to a terminal INTc of the CPU 12 from the protecting circuit 66, that is, when any abnormality takes place, the CPU 12 stops the compressor 44 by means of the external interrupt signal thereof, and also transmits the abnormality signal to the controller 57 of the indoor unit 40 to stop the blower 54.

Although the present invention has been described and illustrated in detail, it is clearly understood that the same is by way of illustration and example only, and is not to be taken by way of limitation, the spirit and scope of the present invention being limited only by the terms of the appended claims.

What is claimed is:

1. An inverter apparatus for providing a periodic output signal, comprising:
   a bridge circuit having a plurality of switching elements each coupled to selectively transmit to an output thereof a first signal level when said switching element is an ON state and a second signal level when it is in an OFF state,
   first memory means for storing pattern data of combinations of ON state and OFF state of said respective switching elements obtained based on the PWM theory,
   time data outputting means for outputting time data corresponding to each said combination of said first memory means, said time data including ON time data defining the time during which said ON state of said respective switching elements is maintained and OFF time data defining the time during which said OFF state of said respective switching elements is maintained, and
   switching signal outputting means responsive to said pattern data and said time data for outputting switching signals to said switching elements, said outputting means including means for selecting for said switching signal a sequence of said pattern data combinations calculated to define a cycle of said output signal for the inverter and means for maintaining each of said pattern data combinations for a time defined by the corresponding time data, whereby the period of the output AC signal cycle defined by said sequence of pattern data combinations can be made to correspond to different frequencies, said switching signals being applied to the respective switching elements of said bridge circuit from which an AC output is outputted, the frequency of said AC output being determined over the entire operating frequency range of the inverter by the total time data of said ON time data and said OFF time data is one cycle.

2. An inverter apparatus in accordance with claim 1, wherein said switching signal outputting means includes a timer means for controlling the holding time of said switching signal based on said time data.

3. An inverter apparatus in accordance with claim 2, wherein said first memory means stores in advance said pattern data for each of plural periods, and said time data outputting means outputs said time data during at least one AC cycle for each of said plural periods.

4. An inverter apparatus in accordance with claim 3, wherein said time data outputting means includes a second memory means for storing in advance said time data for each of said plural periods.

5. An inverter apparatus in accordance with claim 3, wherein said time data outputting means includes a calculating means for calculating to evaluate said time data for at least one of said plural periods.

6. An inverter apparatus in accordance with claim 5, which further comprises a third memory means for storing in advance predetermined numeric values for calculation by said calculating means, and wherein
said calculating means calculates to evaluate said time data based on said predetermined numerical values.

7. A inverter apparatus in accordance with claim 6, wherein said second memory means stores in advance initial values as said time data, and said calculating means calculates to evaluate time data based on said initial values and said predetermined numeric values.

8. An inverter apparatus in accordance with claim 5, wherein said time data outputting means outputs different data according to the ratio of output voltage to output frequency V/F.

9. An inverter apparatus in accordance with claim 8, wherein said third memory means stores said initial value for each V/F.

10. An inverter apparatus in accordance with claim 2, wherein said switching signal outputting means includes a microprocessor, and said microprocessor performs other controls during timer operation by said timer means.

11. An inverter apparatus in accordance with claim 10, which further comprises an air-conditioning system including a motor driven by output from said bridge circuit, and wherein
said microprocessor controls defrosting operation of said air-conditioning system during timer operation by said timer means.

12. An inverter apparatus for providing a periodic output signal which is employed for a refrigerant circuit comprising at least an evaporator, which comprises
a bridge circuit which includes a plurality of switching elements, each coupled to selectively transmit to an output thereof a first signal level when said switching element is an ON state and a second signal level when it is in an OFF state,
first memory means which stores pattern data of combinations of ON/OFF states of said respective switching elements obtained based on the PWM theory,
second memory means which stores time data corresponding to each said pattern combination of said first memory means and representative of the holding time during which said pattern combination is to be held, and
a switching signal outputting means which outputs switching signals to said switching elements based on said pattern data from said first memory means and output of said timer means, and controls defrosting of said evaporator during time-counting operation of said timer means, said outputting means including means for selecting for said switching signal a sequence of said pattern data combinations calculated to define a cycle of said output signal for the inverter and means for maintaining each of said pattern data combinations for a time defined by the corresponding time data, whereby the period of the output AC signal cycle defined by said sequence of pattern data combinations can be made to correspond to different frequencies.

* * * * *